United States Patent
Shinozaki

(10) Patent No.: US 7,069,039 B2
(45) Date of Patent: Jun. 27, 2006

(54) TRANSMISSION POWER CONTROL METHOD AND TRANSMISSION POWER CONTROL DEVICE

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/034,679

(22) Filed: Jan. 13, 2005

(65) Prior Publication Data

US 2005/0130690 A1   Jun. 16, 2005

Related U.S. Application Data

(63) Continuation of application No. PCT/JP02/10139, filed on Sep. 30, 2002.

(51) Int. Cl.
*H04B 7/00* (2006.01)

(52) U.S. Cl. ............................. 455/522; 455/439

(58) Field of Classification Search ............ 455/522, 455/69, 436, 442, 67.13, 135, 439, 161.3, 455/277.2; 370/320, 333, 332
See application file for complete search history.

(56) References Cited

U.S. PATENT DOCUMENTS

2002/0119799 A1* 8/2002 Moulsley et al. ............ 455/525
2003/0114179 A1* 6/2003 Smolyar et al. ............. 455/522
2004/0248581 A1* 12/2004 Seki et al. ................... 455/450

FOREIGN PATENT DOCUMENTS

JP         9-312609      12/1997

* cited by examiner

*Primary Examiner*—Edward F. Urban
*Assistant Examiner*—Tu X. Nguyen
(74) *Attorney, Agent, or Firm*—Katten Muchin Rosenman LLP

(57) ABSTRACT

In transmission power control in a CDMA mobile communication system which controls the uplink transmission power of a mobile station so as to obtain a target SIR, and also controls the target SIR based on the quality of the transmission path, when one mobile station transmits and receives the same data simultaneously with a plurality of base stations, the quality of each transmission path is monitored. The data received over the transmission path with the best quality is selected, and for each transmission path the selectivity of data sent over the transmission path is calculated, the target SIR is updated based on the data quality after data selection, and for each transmission-path the target SIR after updating is multiplied by the selectivity for each transmission path to obtain the actual target SIR for the transmission path.

19 Claims, 13 Drawing Sheets

TRANSMISSION POWER CONTROL METHOD AND TRANSMISSION POWER CONTROL DEVICE

CROSS-REFERENCE TO RELATED APPLICATION

The present application is a continuation of International Application No. PCT/JP02/10139 which was filed on Sep. 30, 2002, which is herein incorporated by reference.

BACKGROUND OF THE INVENTION

This invention relates to a transmission power control method and transmission power control device in a CDMA mobile communication system. In particular, this invention relates to a transmission power control method and transmission power control device which control the uplink transmission power of a mobile station such that a target SIR is obtained for signals received from the mobile station on the mobile network side, and which also control the target SIR based on the quality of the transmission path.

(1) Transmission Power Control of the Prior Art

In mobile communication systems conforming to 3GPP specifications, transmission power control is executed such that prescribed error rates are obtained on the network side and on the mobile station side, and such that the transmission power does not become excessive. FIG. 12 explains transmission power control, and shows a case in which the mobile station uplink transmission power is controlled on the network side.

Signals transmitted from a mobile station 1 are demodulated by the demodulator 2a of the base station 2, and then decoded by the error-correcting decoder 2b. Then CRC error detection is performed for each transport block TrBk in the CRC detector 2c. The error detection result for a transport block TrBk is conveyed to the target SIR control portion 3a of the base station control device 3. The target SIR control portion 3a reduces the target SIR if there are no errors in a prescribed observation interval, and if there are errors, increases the target SIR based on the block error rate, and sets the target SIR in the storage portion 2d of the base station 2. The comparator 2e compares the target SIR with the measured SIR of received signals, measured by the SIR measurement portion 2f, and based on the comparison result creates a TPC bit to control the transmission power of the mobile station 1, and transmits the TPC bit to the mobile station 1. That is, if the measured SIR is greater than the target SIR, a TPC bit is created so as to lower the transmission power by a fixed amount, and if the measured SIR is less than or equal to the target SIR, a TPC bit is created so as to raise the transmission power by a fixed amount; the TPC bit is then transmitted to the mobile station over a dedicated physical control channel DPCCH. The mobile station 1 controls its own transmission power according to the received TPC bit. The feedback loop ILP which controls the uplink transmission power of the mobile station is called the inner loop; the base station 2 performs inner loop transmission power control. The feedback loop OLP which controls the target SIR is called the outer loop; the base station control device performs outer loop transmission power control.

In uplink outer loop transmission power control, when the base station 2 transmits data received from the mobile station 1 to the base station control device 3, information on the quality over the wireless interval (between the mobile station and base station) is appended to the data. Here, quality information are parameters added to the Iub frame protocol in the 3GPP system, and are (1) QE (Quality Estimates), which are error correction information (for example, error correction rates) over the wireless interval, and (2) a CRCI (CRC Indicator), which is the result of judgment of the CRC appended to each transport block TrBk. The base station control device 3 measures the quality of received data over a fixed length of time based on this quality information.

As stated above, quality information includes CRCI and QE; when using CRCI, the base station control device 3 computes the BLER (block error rate) from the CRCI, and uses a comparison of the BLER representing the measured quality and a BLER given as the target quality to compute the uplink target SIR used in inner loop transmission power control. When using QE, the base station control device 3 converts the QE into a BER (bit error rate), computes the average value of the BER over a measurement interval, and uses a comparison of the BER representing the measured quality and a BER given as the target quality to compute the uplink target SIR used in uplink inner loop transmission power control. Computation of the target SIR may be performed in units of received frames, or a measurement interval may be set and computation performed after the measurement interval has expired. If the target SIR obtained in this way differs from the previous value at the end of the measurement time, the new target SIR is input to the base station 2.

(2) Transmission Power Control During Handover

The above is a case in which one mobile station communicates with one base station; during handover, as shown in FIG. 13, the mobile station 1 communicates simultaneously with two base stations 2, 2'. In this case, the base station control device 3 employs the data selection portion 3b to select the uplink data received from the plurality of base stations 2, 2', as shown in FIG. 14, the data with better quality (for example, the data with better quality according to comparison of QE, CRCI, or similar), and the target SIR control portion 3a (FIG. 12) performs quality measurement of the selected data and determines the target SIR. Selection of the data with better quality is called selective diversity, and control at the time of handover is called DHO (Diversity Hand Over). Because quality is improved as a result of selective diversity, the gain resulting from selective diversity is called the diversity gain. In the case of a connection with a single base station, there does not exist other selectable data, selective diversity is not possible, and so diversity gain is not obtained.

The base station control device 3 notifies all base stations 2, 2' for which a connection exists with the mobile station 1 shown in FIG. 14 of the target SIR (Eb/No) computed based on the above data after selection, in conformance with the interface Iub between the base station and the base station control device, and each base station performs inner loop transmission power control based on the target SIR thus received.

(3) Problems

During handover, the DHO (Diversity Hand Over) control explained in FIG. 14 is performed. Hence a target SIR computed for the quality obtained by the diversity gain due to selective diversity is set simultaneously in all base stations, and all base stations perform inner loop transmission power control based on this same value for the target SIR (see FIG. 15). Consequently, in conventional outer loop transmission power control, there is the problem that quality states for each of the transmission paths are not taken into consideration in handover states having a plurality of transmission paths to base stations. In FIG. 15, the polygonal line ZZL is the measured SIR, and the dashed line DL is the target SIR. Uplink transmission power control is performed based on the magnitude relation between the measured SIR and target SIR, and the measured SIR changes, as shown by the polygonal line, as a result. The target SIR is updated in each measurement interval.

Specific problems are explained below, but the following points (1) through (4) must be taken into consideration.

(1) The quality obtained by the diversity gain of selective diversity is better, in the DHO state, than the quality of data transmitted from individual base stations. (2) Further, in conventional methods, upon entering the DHO state (at the start of handover), the uplink target SIR values set in base stations 2, 2' may not be the same for all base stations. (3) In addition, the result obtained may not necessarily indicate that the uplink target SIR in inner loop transmission power control and the quality of data actually received (or the reception SIR) are equal. (4) Further, due to the nature of outer loop control, because the update interval of the target SIR used in inner loop control is extremely long compared with inner loop control, insofar as possible an appropriate target SIR value must be set. If an inappropriate target SIR value were set, transmission power control will be performed according to this inappropriate update value until the time of the next update.

Non-DHO State/Initial DHO State

When the mobile station 1 and the base station 2 are communicating one-to-one, the uplink target SIR value sent to the base station 2 (FIG. 13) and the reference SIR in uplink outer loop transmission power control coincide (see FIG. 16). At this time, the DHO state has not yet been entered, and so there is no need to consider diversity gain due to selective diversity. Hence due to uplink outer loop transmission power control, the updated SIR value (the target SIR value after updating) may be larger than, equal to, or smaller than the reference SIR (the uplink target SIR of the base station 2), depending on the reception quality (see FIG. 16).

Thereafter, upon entering the DHO state, as shown in FIG. 17, the uplink target SIR for inner loop transmission power control set in the newly added base station 2' may be different from that in the base station 2. This is because the conditions of the wireless interval differ for the base stations 2 and 2', so that the values need not be the same. After entering this DHP state, when outer loop transmission power control is executed, the updated SIR is computed for the quality obtained through the diversity gain of selective diversity, as explained above. At this time, the uplink target-SIR value set in base station 2 is used as reference, and so the uplink SIR value set in base station 2' is not taken into consideration (FIG. 17).

Normally the reference SIR value used in outer loop transmission power control must be used to determine the updated SIR based on the virtual SIR due to the DHO effect, taking into account the value set in the base station 2', as shown in FIG. 18. The above is a problem in the initial DHO state.

Problems in the DHO State

Quality judgments performed in outer loop transmission power control are determined by received data error rates and other quality information. However, the average reception level over a short time used in transmission power control does not necessarily correspond to the received data error rate. This is because the received data error rate is not determined only by the reception level, but is also affected by the period of fading and delay profile conditions. Hence the uplink target SIR value set in the newly added base station during DHO cannot be easily inferred from the reception quality; that is, cases are possible in which the average reception level is high and the SIR value is high even when quality is poor. Below, examples of the problem are explained in light of these considerations.

(a) Example of a case in which quality of different transmission paths is poor, but with selective diversity the target quality or better is obtained:

As shown in FIG. 19, there are cases in which the quality of individual transmission paths is worse than the quality target value, but with selective diversity, quality equal to or exceeding the target quality is obtained. That is, even if the quality for the base-stations 2, 2' (indicated by black circles) is below the target quality (BER=1/100 or above), upon entering the DHO state, the quality resulting from selective diversity (black circle) may be equal to or above the target quality (BER less than 1/100). In this case, the initially calculated updated SIR value is smaller than the uplink target SIR value at the current base station 2. With respect to base station 2', if the target SIR value were lower than the target value set in the current base station 2, and also lower than the updated SIR value, then rather than lowering the SIR values of the base stations 2, 2', an operation is instead performed to unnecessarily raise the target SIR value for the base station 2'.

By this means the transmission path quality for base station 2' is improved, and there is the possibility that the quality with selective diversity may be excess quality. And in communications with other mobile stations (in particular, mobile stations served by the base station 2' and similar), noise, that is interference, will be increased, possibly leading to degraded quality.

(b) Example of a case in which quality varies for different transmission-paths, and quality is poor even with diversity gain:

As shown in FIG. 20, there are cases in which the quality of each transmission path is poor, and the quality with selective diversity is also lower than the target quality. That is, there are cases in which the quality (black circles) of the base stations 2, 2' is lower than the target quality (BER=1/100 or higher), and when the DHO state is entered, the quality (black circle) due to selective diversity is also lower than the target quality (BER=1/100 or higher). In such cases, upon entering the DHO state, the initially calculated updated SIR value is higher than the uplink target SIR value of the current base station 2. With respect to base station 2', if the uplink target SIR value is higher than the value set for the current base station 2, and is also higher than the updated SIR value, then rather than raising the separate SIR values, an operation is instead performed to lower the value for the base station 2'. As a result there is the possibility that the transmission quality for the base station 2' is worsened, an appropriate diversity gain cannot be obtained, and the quality with selective diversity is worsened.

(c) Excessive Increase in SIR Value

As shown in FIG. 21, there are cases in which the quality of each transmission path is poor, and the quality with selective diversity is also below the target quality. That is, there are cases in which the quality (black circles) of the base stations 2, 2' is lower than the target quality (BER=1/100 or higher), and when the DHO state is entered, the quality (black circle) due to selective diversity is also lower than the target quality (BER=1/100 or higher). Suppose that in such a case, cause of poor reception quality, the SIR value of base station 2 is the highest value for obtaining the required target quality through power control up to immediately before the DHO state. If at this time the uplink target SIR value set in the newly added base station 2' is low, and moreover data quality is poor, the updated SIR value will be higher than the value set in base station 2. Consequently the amount of change in the target SIR value at base station 2' is be extremely large, prompting an increase in power, and power control will result which intensifies interference with other mobile stations.

SUMMARY OF THE INVENTION

In light of the above, an object of this invention is to enable power control which takes into consideration the diversity gain of selective diversity. By means of such power control, unnecessary noise (interference) in wireless intervals can be reduced, wireless resources can be secured, that is, the number of users accommodated in a cell (cell capacity) can be increased, and there is also the advantage that power consumption of mobile stations is reduced. This is because it is sufficient to request quality for transmission path data from mobile stations which takes diversity gain into account. Moreover, by means of this invention a number of devices which heretofore had been necessary become unnecessary, leading to cost decreases and reductions in the scale of circuits.

This invention relates to transmission power control in a CDMA mobile communication system, in cases in which a mobile station transmits and receives the same data with a plurality of base stations simultaneously, during handover or at other times. The essence of this transmission power control is that the uplink transmission power of the mobile station is controlled so as to obtain the target SIR, and in addition the target SIR is controlled based on the quality of the transmission path.

In a first invention, (1) when a mobile station transmits and receives the same data simultaneously with a plurality of base stations, the data received via one of the transmission paths (for example, the transmission path with the best quality, obtained by monitoring quality of each transmission path) is selected, and for each transmission path, the selection conditions for data sent are obtained (for example, the selectivity is calculated); (2) based on the data quality after data selection, the target quality (for example, the target SIR) is updated; and, (3) the target quality after updating is made to reflect the selection conditions for the respective transmission paths (for example, multiplying by the selectivity), and the result is taken to be the actual target quality for the respective transmission paths.

In a second invention, (1) when a mobile station transmits and receives the same data simultaneously with a plurality of base stations, the data received via one of the transmission paths (for example, the transmission path with the best quality, obtained by monitoring quality of each transmission path) is selected, and for each transmission path, the selection conditions for data sent are obtained (for example, the selectivity is calculated); then, for each transmission path, (2) the target quality (for example, the target SIR) is updated based on the data quality prior to data selection; and, (3) the target quality after updating is made to reflect the selection conditions for the transmission path (for example, multiplying by the selectivity), and the result is taken to be the actual target quality for the transmission path.

In a third invention, (1) when a mobile station transmits and receives the same data simultaneously with a plurality of base stations, the data received via one of the transmission paths (for example, the transmission path with the best quality, obtained by monitoring quality of each transmission path) is selected, and for each transmission path, the selection conditions for data sent are obtained (for example, the selectivity is calculated); (2) based on the data quality after data selection, the target quality (for example, the target SIR) is updated; (3) the difference between the target quality value after updating and the reference quality value which is the previously updated quality value is computed; (4) this difference is made to reflect the selection conditions of the respective transmission paths (for example, multiplying by the selectivity) to calculate the increase or decrease in the target quality for each transmission path; and, (5) the increase or decrease for each transmission path is added to the target quality for the transmission path up to that time, and the result is taken to be the actual target quality for the transmission path.

In a fourth invention, (1) when a mobile station transmits and receives the same data simultaneously with a plurality of base stations, the data received via one of the transmission paths (for example, the transmission path with the best quality, obtained by monitoring quality of each transmission path) is selected, and for each transmission path, the selection conditions for data sent are obtained (for example, the selectivity is calculated); then, for each transmission path, (2) the target quality (for example, the target SIR) is updated based on the data quality prior to data selection; (3) the difference between the target quality value after updating and the target quality for the transmission path up to that time is computed; (4) this difference is made to reflect the selection conditions of the transmission path (for example, multiplying by the selectivity) to calculate the increase or decrease in the target quality for the transmission path; and, (5) the increase or decrease is added to the target quality for the transmission path up to that time, to obtain the new target quality.

Through the above first through fourth inventions, power control which takes into consideration the diversity gain due to selective diversity can be executed.

DESCRIPTION OF THE PREFERRED EMBODIMENTS (A) First Embodiment

Figure 1:
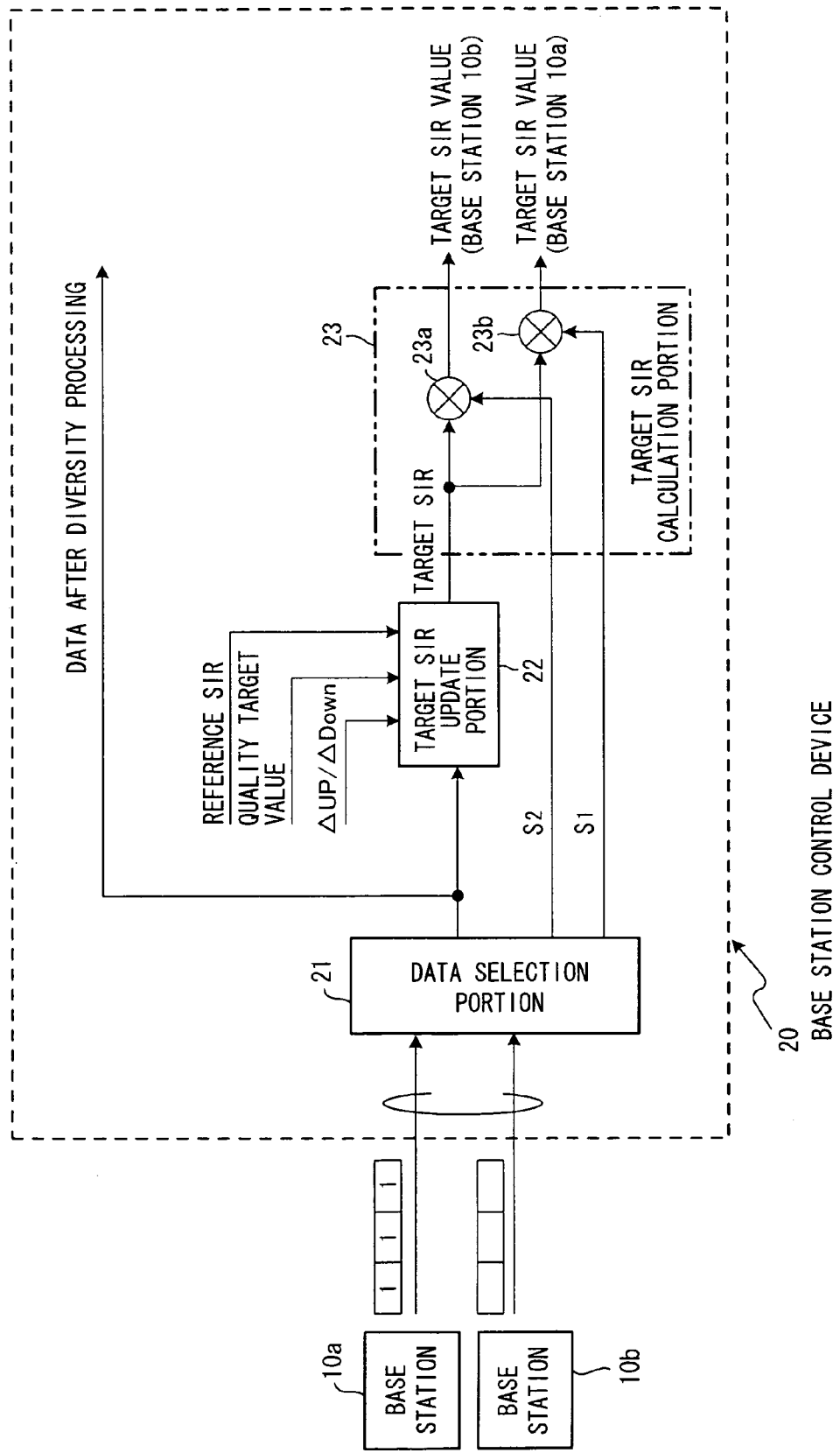
FIG. 1 is a drawing of the configuration of a first embodiment of a transmission power control device.

FIG. 1 is a drawing of the configuration of a first embodiment of a transmission power control device, provided within a base station control device (a higher-level device relative to a base station). A summary of the first embodiment is as follows.

Figure 14:
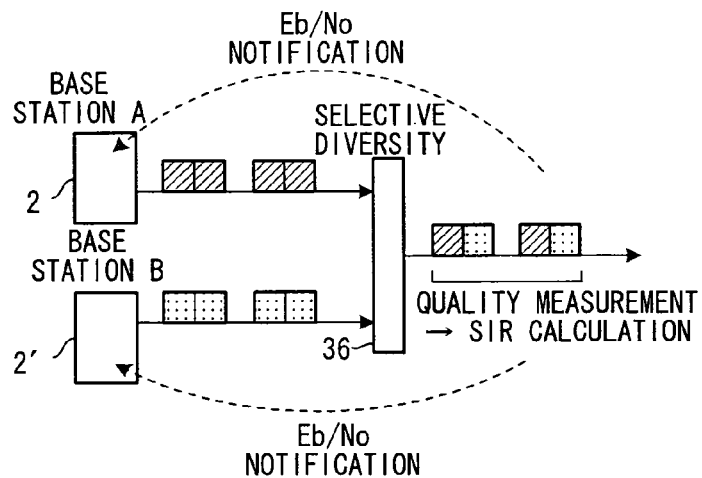
FIG. 14 explains selective diversity in the base station control device.
Figure 15:
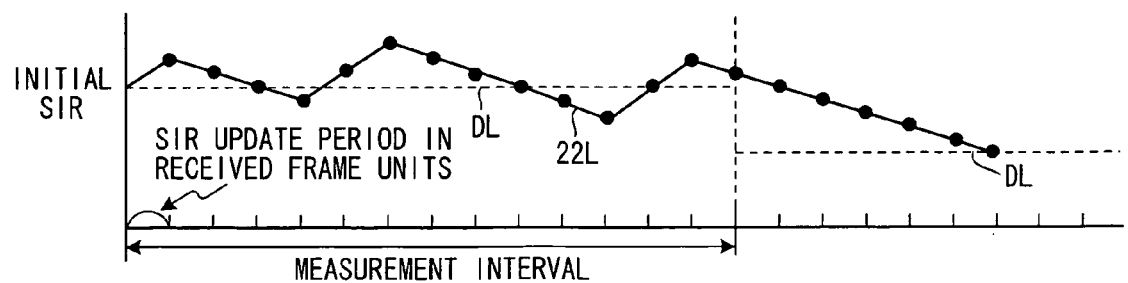
FIG. 15 explains inner loop transmission power control.
Figure 16:
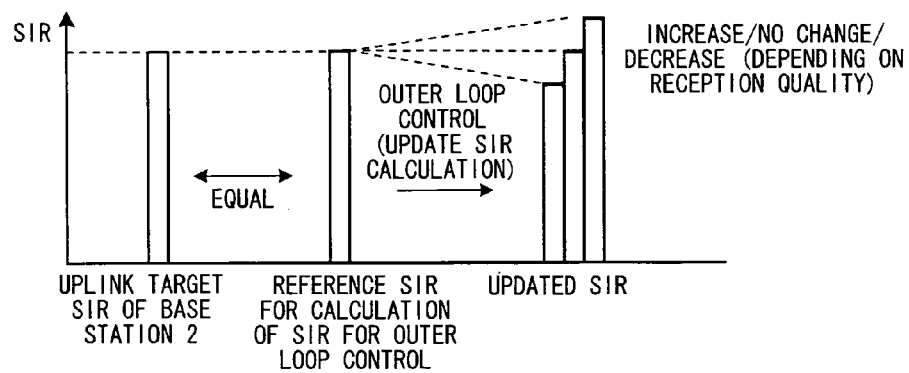
FIG. 16 is a drawing of SIR correlation in a non-DHO state.
Figure 17:
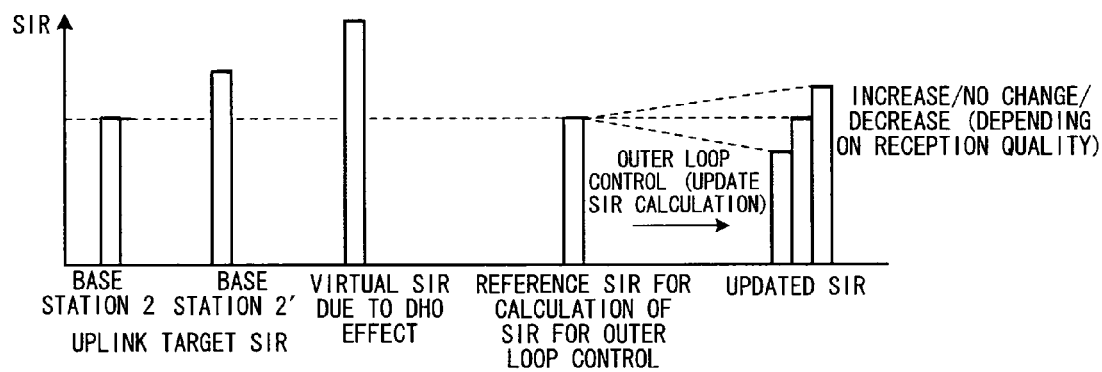
FIG. 17 is a drawing of SIR correlation in an initial DHO state.
Figure 18:
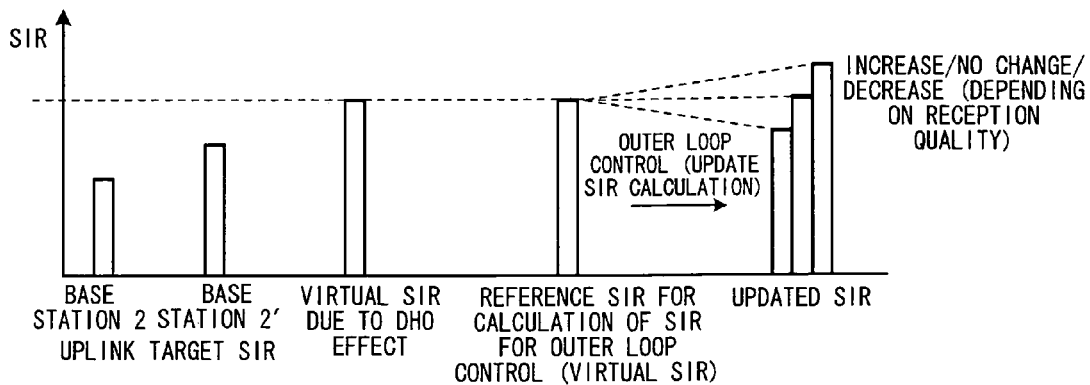
FIG. 18 is a drawing of SIR correlation taking the DHO effect into account.
Figure 19:
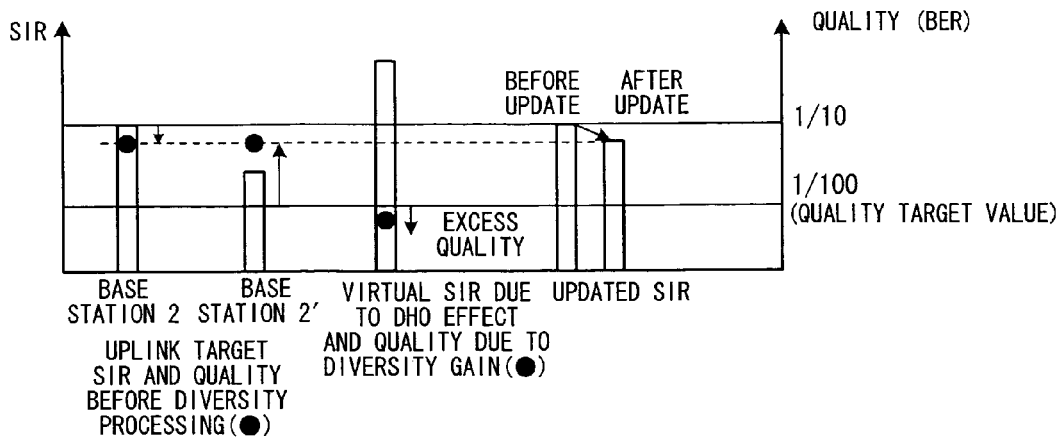
FIG. 19 explains an example of an operation to raise the SIR regardless of excess quality.
Figure 20:
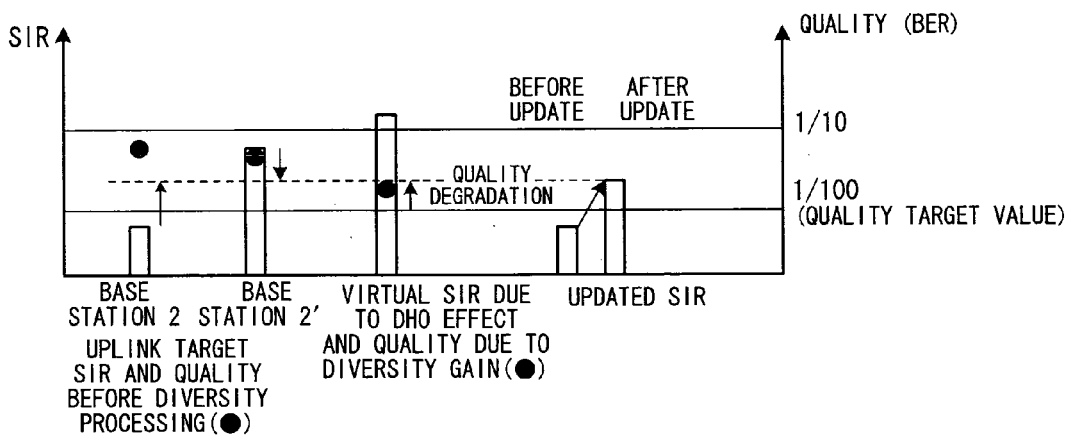
FIG. 20 is an explanatory drawing showing a case in which the SIR is lowered regardless of quality degradation; and, FIG. 21 is an explanatory drawing showing a case resulting in an inadvertent increase in SIR value.
Figure 21:
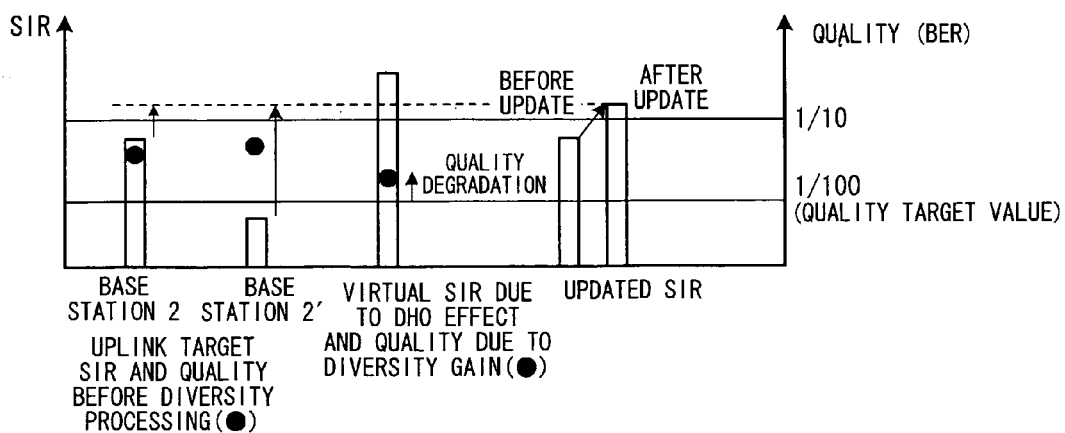

Due to the diversity gain obtained as a result of selective diversity (see FIG. 14) in the base station control device, the data received from individual base stations does not necessarily satisfy the target quality. In other words, it is sufficient that the quality resulting from diversity satisfy the target quality. Because only selected data contributes to this target quality, the target quality is thought to be maintained according to the following equation:

target quality=target quality×(first base station selectivity+second base station selectivity)

Therefore, in the first embodiment, the data selectivities s1, s2 of each of the transmission paths are multiplied by the updated target SIR value based on the data quality after diversity, and the target SIR thus obtained is taken to be the true target SIR value in each of the base stations. The above is a summary of the first embodiment; below, overall operation is explained referring to FIG. 1 through FIG. 3.

At the time of handover, the mobile station transmits and receives the same data simultaneously with a plurality of base stations (in the drawing, the two base stations 10*a*, 10*b*). Upon receiving data from the mobile station, each of the base stations 10*a* and 10*b* detects errors in the received data, appends a quality identifier (in the case of 3GPP specifications, QE (Quality Estimates) and CRCI (CRC Indicator)) to the received data, in for example transport block units or frame units, and sends the data to the base station control device 20.

The data selection portion 21 of the base station control device 20 references the quality identifier appended to the received data, selects data with the best quality in each frame, and outputs this data as data after diversity processing. The data selection portion 21 also calculates and outputs, for each transmission path, the selectivities s1, s2 of data sent via the transmission path. The target SIR update portion 22 uses the quality identifier appended to the selected data to measure the quality after data selection, compares the measured quality with the quality target value, and updates the target SIR based on the comparison result. For example, if the measured quality is worse that the quality target value, a prescribed increase step amount ΔUP is added to the reference SIR (the target SIR set in the base station which had been communicating before the handover) to update the target SIR, and if the measured quality is better than the quality target value, a prescribed decrease step amount Δdown is subtracted from the reference SIR to update the target SIR. The target SIR after updating becomes the next reference SIR.

Figure 4:
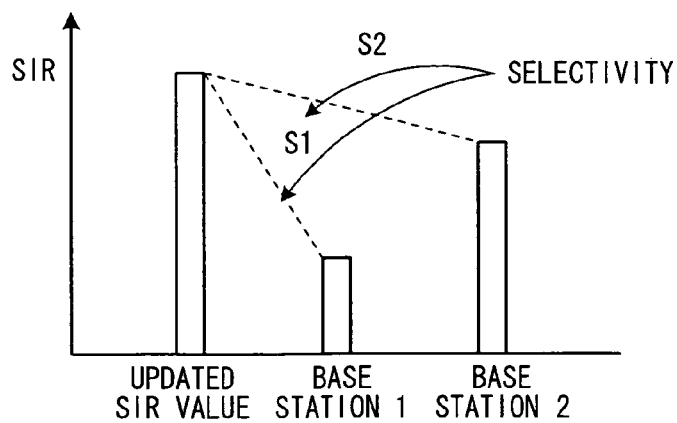
FIG. 4 explains the target SIR of each base station in the first embodiment.

The target SIR calculation portion 23 comprises two multipliers 23*a*, 23*b*; the target SIR after updating is multiplied by the selectivities s1, s2 of each of the transmission paths to calculate the actual target SIRs of the respective transmission paths (see FIG. 4), which are respectively set in the base stations 10*a*, 10*b*. Here, as a method of reflecting the selectivity, as the selection condition, in the target quality (SIR), the target SIR is multiplied by each of the selectivities; but various methods of reflecting the selection condition are conceivable, such as increasing the degree of control on the more-selected side, or setting a higher target SIR on the more-selected side.

Figure 2:
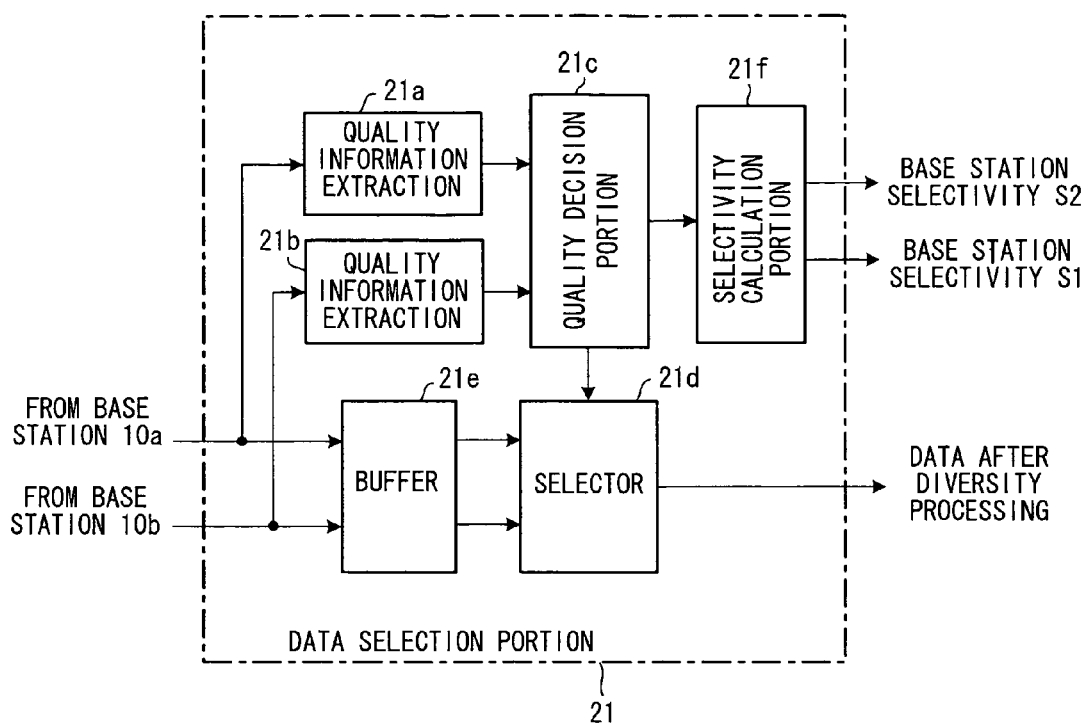
FIG. 2 is an example of the configuration of the data selection portion.

FIG. 2 is an example of the configuration of the data selection portion 21; the quality information extraction portions 21*a*, 21*b* extract quality information from the data series input from the base stations 10*a*, 10*b*, and input the quality information to the quality decision portion 21*c*. The quality decision portion 21*c* decides on the best-quality data for each frame, and inputs this data to the selector 21*d*. The selector 21*d* selects the good-quality data which is temporarily stored in the buffer 21*e*, and outputs this as diversity data. Also, for each frame the quality decision portion 21*c* inputs to the selectivity calculation portion 21*f* information indicating which of the base stations has input data of good quality. The selectivity calculation portion 21*f* counts the number of times data has been input from each of the base stations, and calculates and outputs the data selectivities s1, s2 for each base station.

Figure 3:
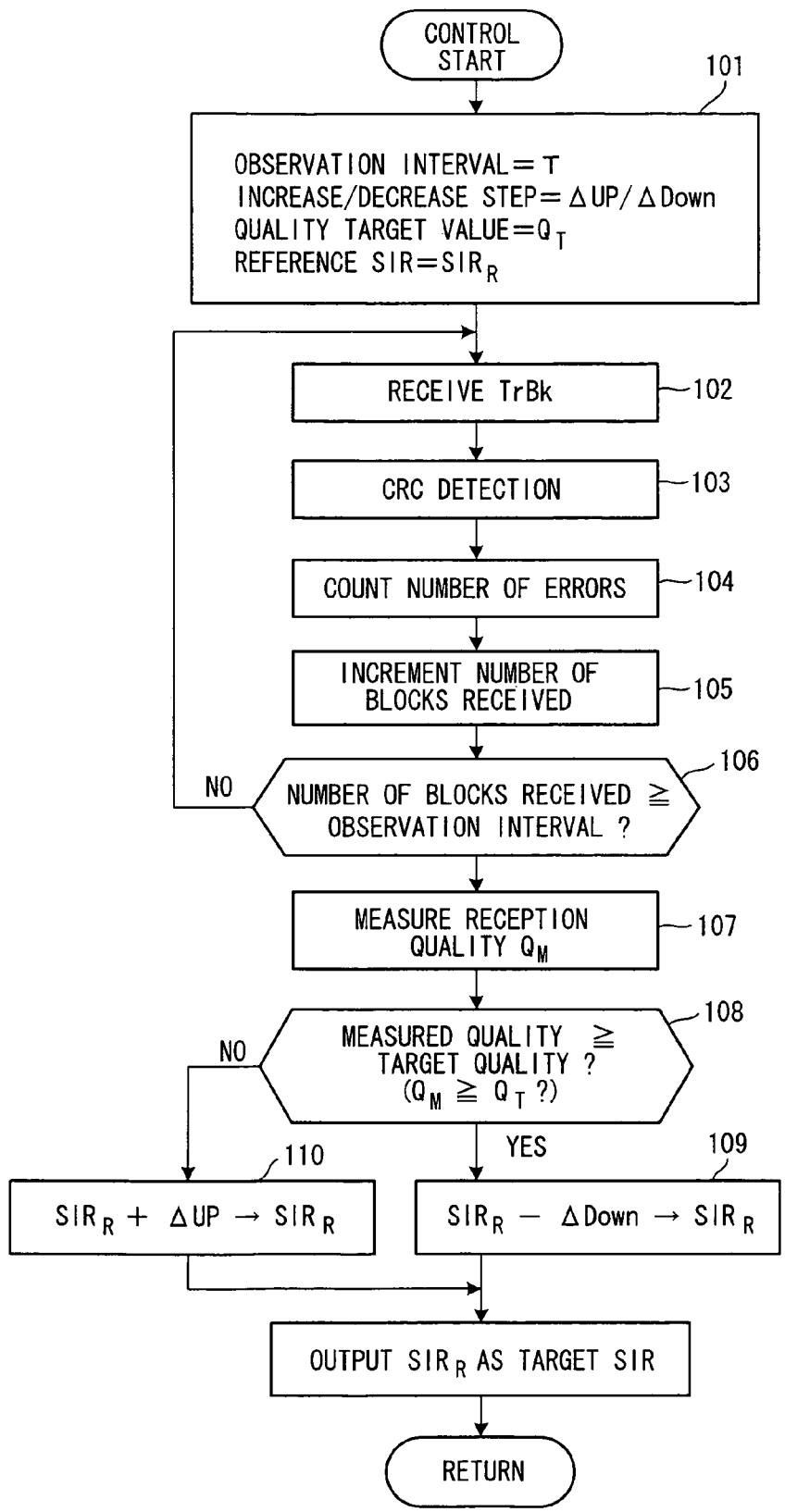
FIG. 3 shows the processing flow of the target SIR update portion.

FIG. 3 shows the processing flow of the target SIR update portion 22.

At the start of control, the target SIR update portion 22 sets initial values of the observation interval T, increase/decrease steps ΔUP/Δdown, quality target value $Q_T$, and reference SIR (=$SIR_R$) (step 101). The observation interval T is input as a number of blocks or as a number of frames; the quality target value $Q_T$ is input as a block error rate BELR. The initial value of the reference SIR (=$SIR_R$) is the target SIR set in the base station which had been communicating prior to the handover.

Upon input of data from the data selection portion 21, the target SIR update portion 22 references the CRCI and counts the number of errors for each transport block TrBk (steps 102 to 104), increments the number of blocks received (step 105), checks whether the number of blocks received has reached the number of blocks of the observation interval (step 106), and if the number of received blocks has not reached the number of blocks of the observation interval, performs the processing of step 102 and later, but if the number of blocks received has reached the number of blocks of the observation interval, calculates the reception quality $Q_M$ (block error rate) from the number of block errors and the number of received blocks (step 107). Then, the measured quality $Q_M$ is compared with the target quality $Q_T$ (step 108).

If the measured quality $Q_M$ is better than the target quality $Q_T$, the equation $$SIR_R = SIR_R - \Delta\text{down}$$

is used to compute the target SIR (step 109). That is, if the conditions of the transmission path are good and the quality of the received data is good, the target SIR is reduced by the amount Δdown. On the other hand, if the measured quality $Q_M$ is worse than the target quality $Q_T$, the equation $$SIR_R = SIR_R + \Delta UP$$

is used to compute the target SIR (step 110). That is, if the conditions of the transmission path are poor and the quality of the received data is poor, the target SIR is increased by the amount ΔUP.

Then, $SIR_R$ is taken to be the target SIR after updating, and is input to the base station-specific target SIR calculation portion 23 (FIG. 1) (step 111). The target SIR after updating becomes the next reference SIR.

However, in an extreme case in the first embodiment, one of the selectivities may be too great and the other selectivity may be too small, so that the target SIR may be too low. Hence means are provided in the last stage of the target SIR calculation portion 23 to set a minimum value for the target SIR and execute control such that the target SIR does not become smaller than this minimum value. Or, a minimum value for the selectivity can be set, and the selectivity determined so as never to be smaller than the minimum value. For example, if the minimum value is smin (<1.0) and the actual selectivities are s1 and s2, then the selectivities S1, S2 are determined using the equations $$S1 = (1-smin) \times s1/(s1+s2) + smin$$

$$S2 = (1-smin) \times s2/(s1+s2) + smin$$

According to the first embodiment described above, transmission power control which takes into consideration the diversity gain of selective diversity can be performed. By means of the first embodiment, if instructions are given to increase (or decrease) the target SIR, the target SIR values of each of the base stations can be controlled to reliably increase (or decrease), and moreover the control width of the target SIR can be made small. As a result, unnecessary noise (interference) in wireless intervals can be reduced, and wireless resources can be secured, that is, the number of users accommodated in a cell (cell capacity) can be increased. Further, power consumption by the mobile station can be reduced.

Figure 5:
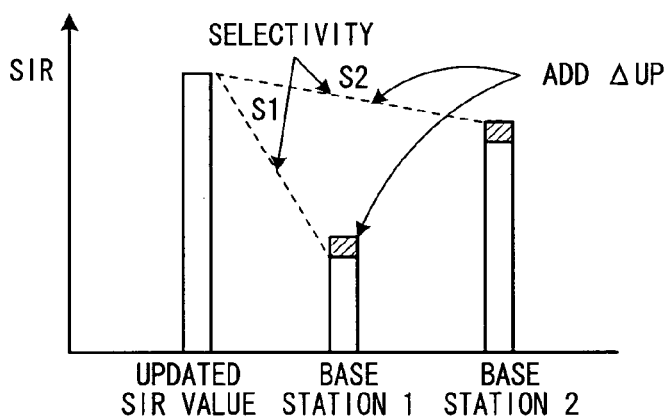
FIG. 5 explains a modified example of the first embodiment.

FIG. 5 explains a modified example of the first embodiment. In the first embodiment, the target SIR determined from the data quality after diversity processing was multiplied by the data selectivities of the respective transmission paths (here, s1<s2), and the results are used as target SIR values for the respective transmission paths. However, it is necessary to taken into consideration that (1) SIR value and reception quality are not necessarily equal, and (2) data selectivity is always changing. Hence in this modified example, as shown in FIG. 5, by adding a margin value ΔUP to the target SIRs for each transmission path obtained in the first embodiment, problems arising from the factors (1) and (2) can be eliminated. ΔUP is the same as the increase step amount used in the target SIR update portion 22.

Figure 6:
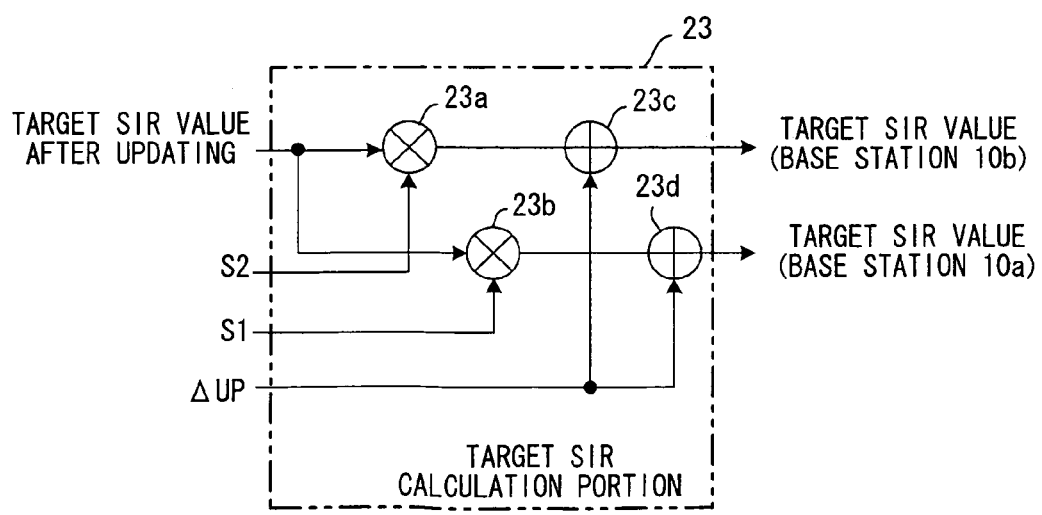
FIG. 6 is a drawing of the configuration of the base station-specific target SIR calculation portion of the modified example.

FIG. 6 is a drawing of the configuration of the target SIR calculation portion 23 of the modified example; addition portions 23c, 23d are newly added. These addition portions 23c, 23d add the margin value ΔUP to the outputs of the multipliers 23a, 23b, and output the addition result as the true target SIR for the respective base stations 10a, 10b.

(B) Second Embodiment

Figure 7:
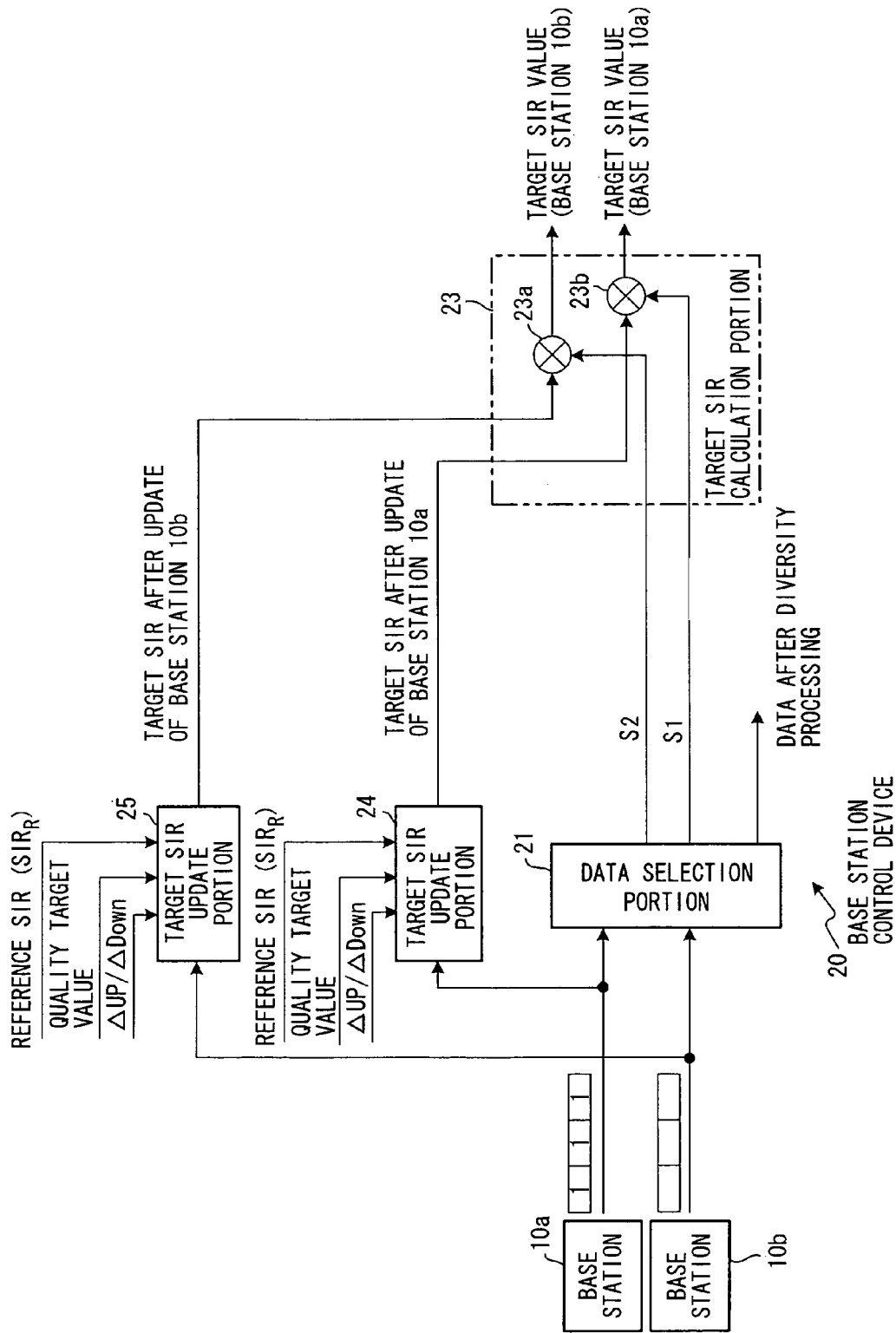
FIG. 7 is a drawing of the configuration of a second embodiment of a transmission power control device.

FIG. 7 is a drawing of the configuration of a second embodiment of a transmission power control device, provided within the base station control device. In the second embodiment, portions which are the same as in the first embodiment are assigned the same symbols. A difference is that in the first embodiment, the data quality after selective diversity processing is measured, whereas in the second embodiment, data quality is measured for the different data prior to selective diversity processing.

The target SIR update portion 24 measures the quality of data input from the base station 10a before selective diversity processing, updates the target SIR of the base station 10a based on the measured quality, and inputs the updated target SIR to the multiplier portion 23b of the target SIR calculation portion 23. The target SIR update portion 24 performs update processing according to the processing flow of FIG. 3, but the reference SIR value is the same as the target SIR value set in the base station 10a.

The target SIR update portion 25 measures the quality of data input from the base station 10b before selective diversity processing, updates the target SIR of the base station 10b based on the measured quality, and inputs the updated target SIR to the multiplier portion 23a of the target SIR calculation portion 23. The target SIR update portion 25 performs update processing according to the processing flow of FIG. 3, but the reference SIR value is the same as the target SIR value set in the base station 10b.

The multiplier portion 23b of the target SIR calculation portion 23 multiplies the target SIR of the base station 10a after updating by the selectivity s1 to calculate the actual target SIR of the base station 10a, and sets the result in the base station 10a. The calculation portion 23a multiplies the target SIR of the base station 10b after updating by the selectivity s2 to calculate the actual target SIR of the base station 10b, and sets the result in the base station 10b.

According to the transmission power control of the second embodiment as described above, the target SIR of a base station is calculated based on the data quality before diversity processing, and multiplies this target SIR by the selectivity to obtain the actual target SIR. Hence the actual target SIR value to attain the quality target value can be made small, transmission power control which takes into consideration the diversity gain of selective diversity can be performed, and the transmission power of the mobile station can be reduced.

(C) Third Embodiment

Figure 8:
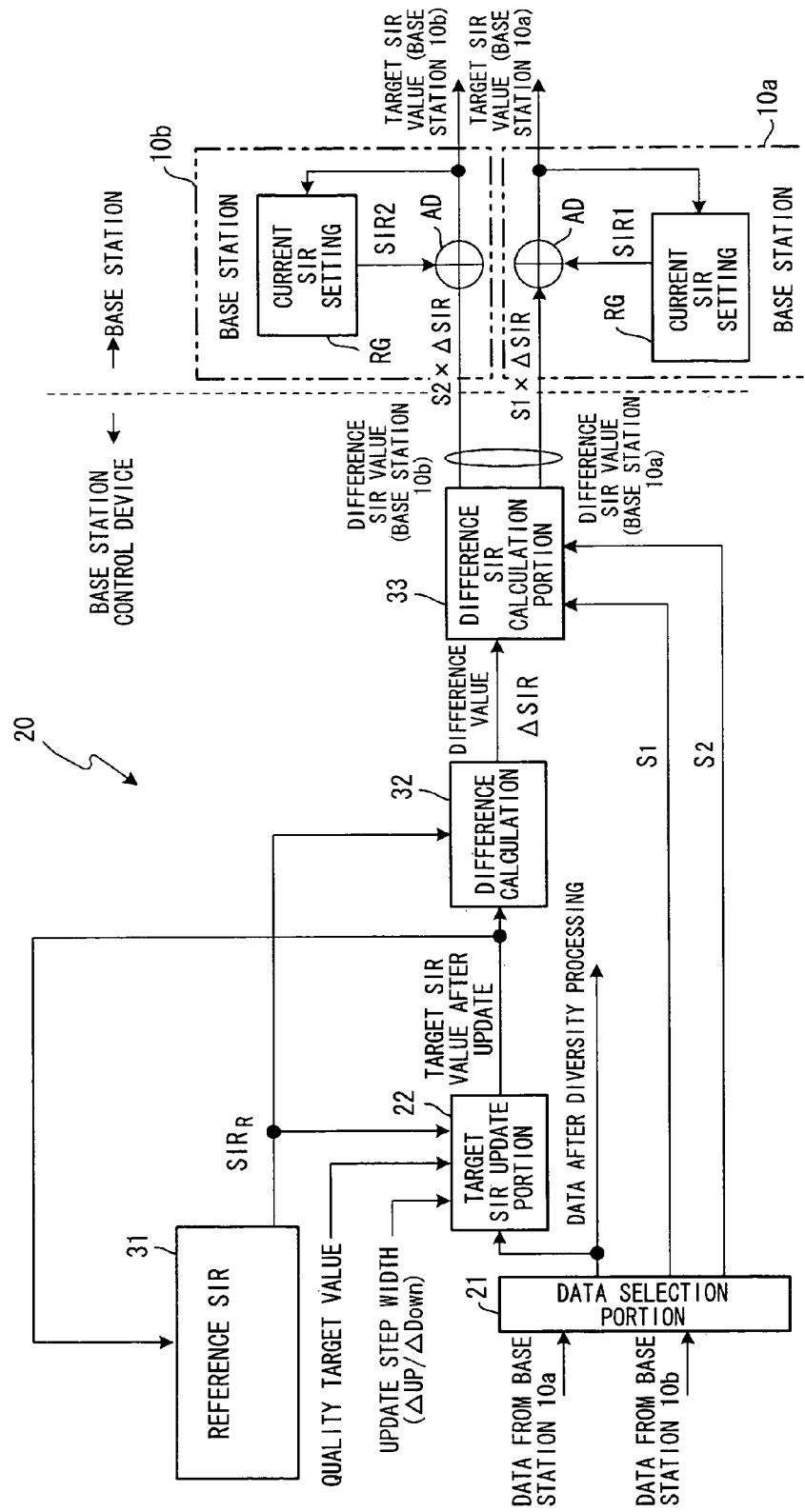
FIG. 8 is a drawing of the configuration of a third embodiment of a transmission power control device.

FIG. 8 is a drawing of the configuration of a third embodiment of a transmission power control device; portions which are the same as in the first embodiment of FIG. 1 are assigned the same symbols.

During handover, the mobile station transmits and receives the same data simultaneously with a plurality of base stations (in the drawing, two base stations). Each of the base stations 10a, 10b, upon receiving data from the mobile station, detects errors in the received data, appends a quality identifier to the received data, in for example transport block units or frame units, and sends the data to the base station control device 20. In FIG. 8, the quality identifier appending portion, received data transmission portion, and other portions in the base station are omitted.

The data selection portion 21 of the base station control device 20 references the quality identifier appended to the received data, selects the data with the best quality in each frame, and outputs the data as data after diversity processing. The data selection portion 21 calculates and outputs, for each transmission path, the selectivities s1, s2 of data sent over the transmission path.

The target SIR update portion 22 measures the quality after data selection using the quality identifier appended to the selected data, according to the processing flow of FIG. 3, compares the measured data with the quality target value, and updates the target SIR based on the comparison result. For example, if the measured quality is worse that the quality target value, a prescribed increase step amount $\Delta UP$ is added to the reference SIR (the target SIR set in the base station communicating before the handover) stored in register 31 to update the target SIR, and if the measured quality is better than the quality target value, a prescribed decrease step amount $\Delta down$ is subtracted from the reference SIR to update the target SIR. The target SIR after updating becomes the next reference SIR.

The difference calculation portion 32 calculates the difference $\Delta SIR$ between the target SIR value after updating, and the reference SIR value $SIR_R$ which is the previously updated SIR value. The difference SIR calculation portion 33 multiplies this difference $\Delta SIR$ by the selectivities s1, s2 of each of the transmission paths to compute the increase or decrease $s1 \times \Delta SIR$, $s2 \times \Delta SIR$ in the target SIR for each of the transmission paths, and sends the results to the respective base stations 10a, 10b.

The addition portion AD in each of the base stations 10a, 10b adds the respective increase/decrease $s1 \times \Delta SIR$, $s2 \times \Delta SIR$ in the target SIR received from the base station control device 20 to the current target SIR1, SIR2 set in the register RG, for use as the new target SIR. Subsequently, the base stations 10a, 10b execute transmission power control for the mobile station based on the new target SIR values.

Figure 9:
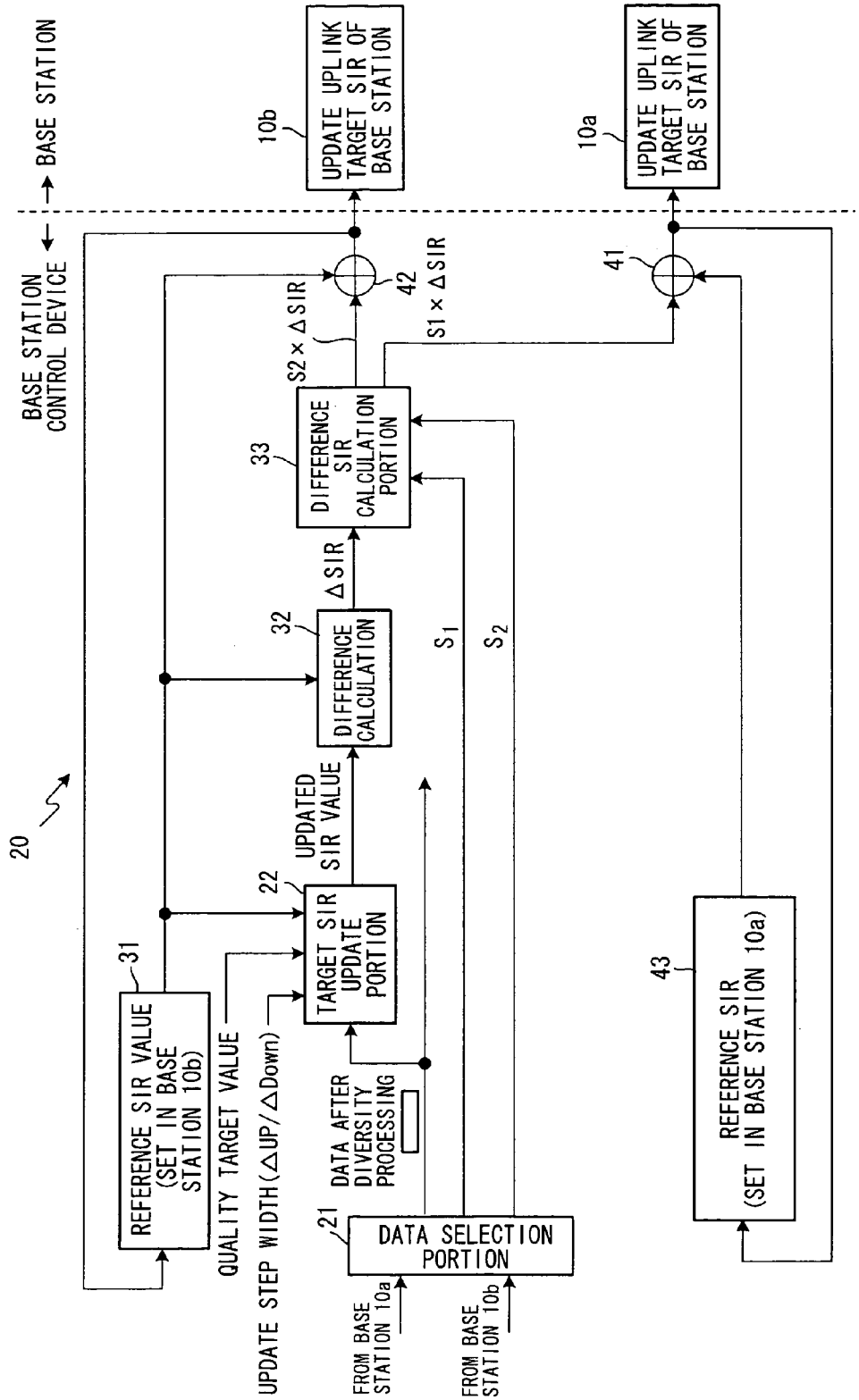
FIG. 9 is a modified example of the third embodiment.

FIG. 9 is a modified example of the third embodiment. In the third embodiment, the new target SIR values for the base stations 10a, 10b are calculated by the base stations; in the modified example, the base station control device calculates the new target SIR values for the base stations 10a, 10b and sends them to the base stations.

The difference SIR calculation portion 33 multiplies the difference value $\Delta SIR$ by the selectivities s1, s2 of each of the transmission paths, and inputs the increase/decrease amounts $s1 \times \Delta SIR$, $s2 \times \Delta SIR$ in the target SIR values for each transmission path to the addition portions 41, 42. The addition portion 41 adds the reference SIR (the target SIR set in the base station 10a before handover) stored in the register 43 and the increase/decrease amount $s1 \times \Delta SIR$, and sends the result to the base station 10a. And, the addition portion 42 adds the reference SIR (the target SIR set in the base station 10b before handover) stored in the register 31 and the increase/decrease amount $s2 \times \Delta SIR$, and sends the result to the base station 10b. The base stations 10a, 10b subsequently execute transmission power control for the mobile station based on the new target SIR values which have been sent. The target SIR values output by the addition portions 41, 42 become the next reference SIR values.

According to the third embodiment described above, the target-SIR for each base station is made to reflect the difference between the target SIR determined based on the data quality after diversity processing and the previous target SIR, according to the selectivity; hence the target SIR values for each base station can be controlled gradually, and more finely-tuned transmission power control can be executed, taking into account the diversity gain of selective diversity. By means of the third embodiment, the base station target SIR can be kept from becoming too small even when the selectivity is small, and large fluctuations in the target SIR can be eliminated.

(D) Fourth Embodiment

Figure 10:
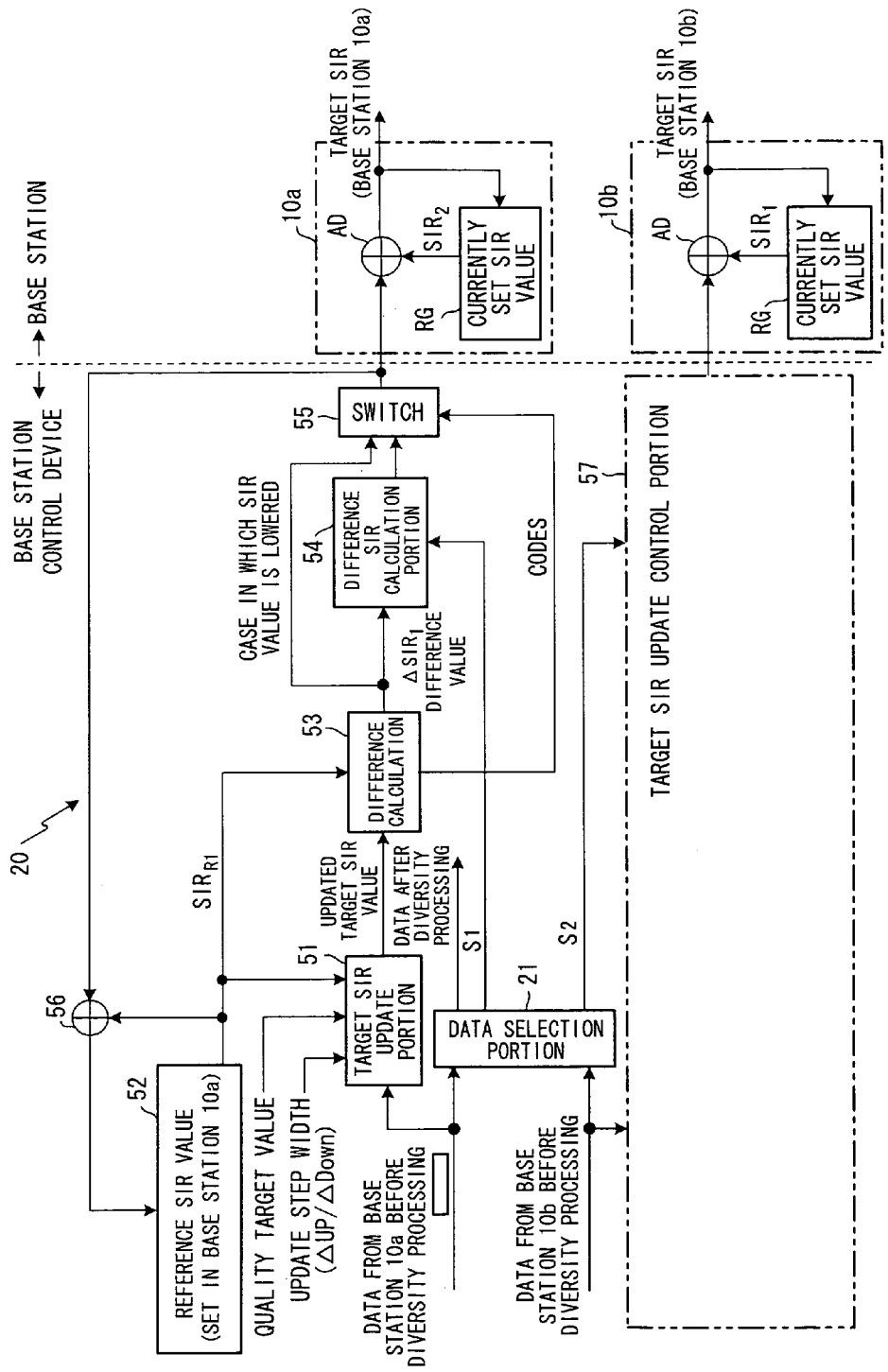
FIG. 10 is a drawing of the configuration of a fourth embodiment of a transmission power control device.

FIG. 10 is a drawing of the configuration of a fourth embodiment of a transmission power control device; portions which are the same as in the third embodiment of FIG. 8 are assigned the same symbols. A difference is that in the third embodiment, the data quality after selective diversity processing is measured and the increase or decrease in target SIR is calculated, whereas in the fourth embodiment the data quality is measured for the different data prior to selective diversity processing, and the increase or decrease in the target SIR is calculated.

At the time of handover, the mobile station transmits and receives the same data simultaneously with a plurality of base stations (in the drawing, two base stations). Upon receiving data from the mobile station, each of the base stations 10a, 10b detects errors in the received data, appends a quality identifier to the received data in for example transport block units or frame units, and sends the data to the base station control device 20. In FIG. 10, the quality identifier appending portion, received data transmission portion, and other portions in the base stations 10a, 10b are omitted.

The data selection portion 21 of the base station control device 20 references the quality identifier appended to the received data, selects the data with the best quality in each frame, and outputs this data as data after diversity processing. The data selection portion 21 also calculates and outputs, for each transmission path, the selectivities s1, s2 of the data sent over the transmission path.

The target SIR update portion 51 uses the quality identifier-appended to the data to measure the quality of data prior to data selection, compares the measured quality and the quality target value, and based on the comparison result updates the target SIR of the base station 10a, according to the processing flow of FIG. 3. For example, if the measured quality is worse than the quality target value, a prescribed increase step amount $\Delta UP$ is added to the reference SIR (the target sir set in the base station 10a prior to handover) stored in register 52 to update the target SIR, and if the measured quality is better than the quality target value, a prescribed decrease step amount $\Delta down$ is subtracted from the reference SIR to update the target SIR. The target SIR after updating becomes the next reference SIR.

The difference calculation portion 53 calculates the difference $\Delta SIR_1$ between the target SIR value after updating and the reference SIR value $SIR_{R1}$ which is the previous updated SIR value, and inputs the result to the difference SIR calculation portion 54 and switching portion 55. The difference SIR calculation portion 54 multiplies the difference value $\Delta SIR_1$ by the selectivity s1 of the transmission path to calculate the increase or decrease $s1 \times \Delta SIR_1$ in the target SIR, which is input to the switching portion 55.

When the difference $\Delta SIR_1$ is negative and the target SIR value has fallen, the transmission path satisfies the target quality. Hence the switching portion 55 transmits the difference $\Delta SIR_1$ without modification to the base station 10a as the difference with the current target SIR. However, if the difference $\Delta SIR_1$ is positive and the target SIR value has risen, the switching portion 55 transmits $s1 \times \Delta SIR_1$ to the base station 10a as the difference with the current target SIR.

The addition portion AD of the base station 10a adds the increase or decrease in target SIR received from the base station control device 20 to the current target SIR1 set in the register RG, and uses the result as the new target SIR. Subsequently, the base station 10a executes transmission power control for the mobile-station based on the new target SIR. The adder 56 adds the output of the switching portion 55 to the current reference SIR, and stores the addition result in the register 52 as the new reference SIR.

The above explanation is for a case in which the target SIR of the base station 10a is updated; the target SIR of the base station 10b is similarly updated by the target SIR update control portion 57.

Figure 11:
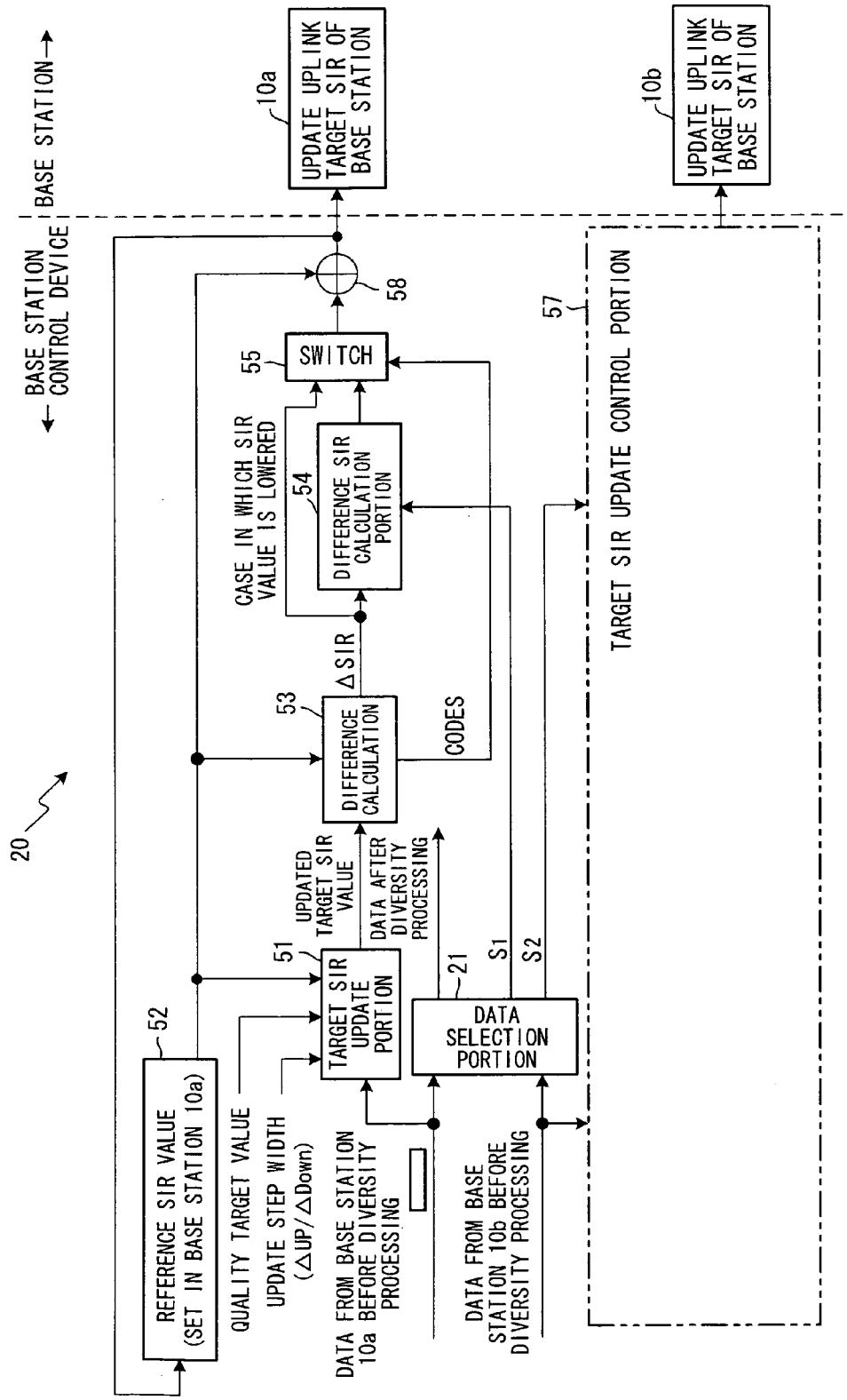
FIG. 11 is a modified example of the fourth embodiment.
Figure 12:
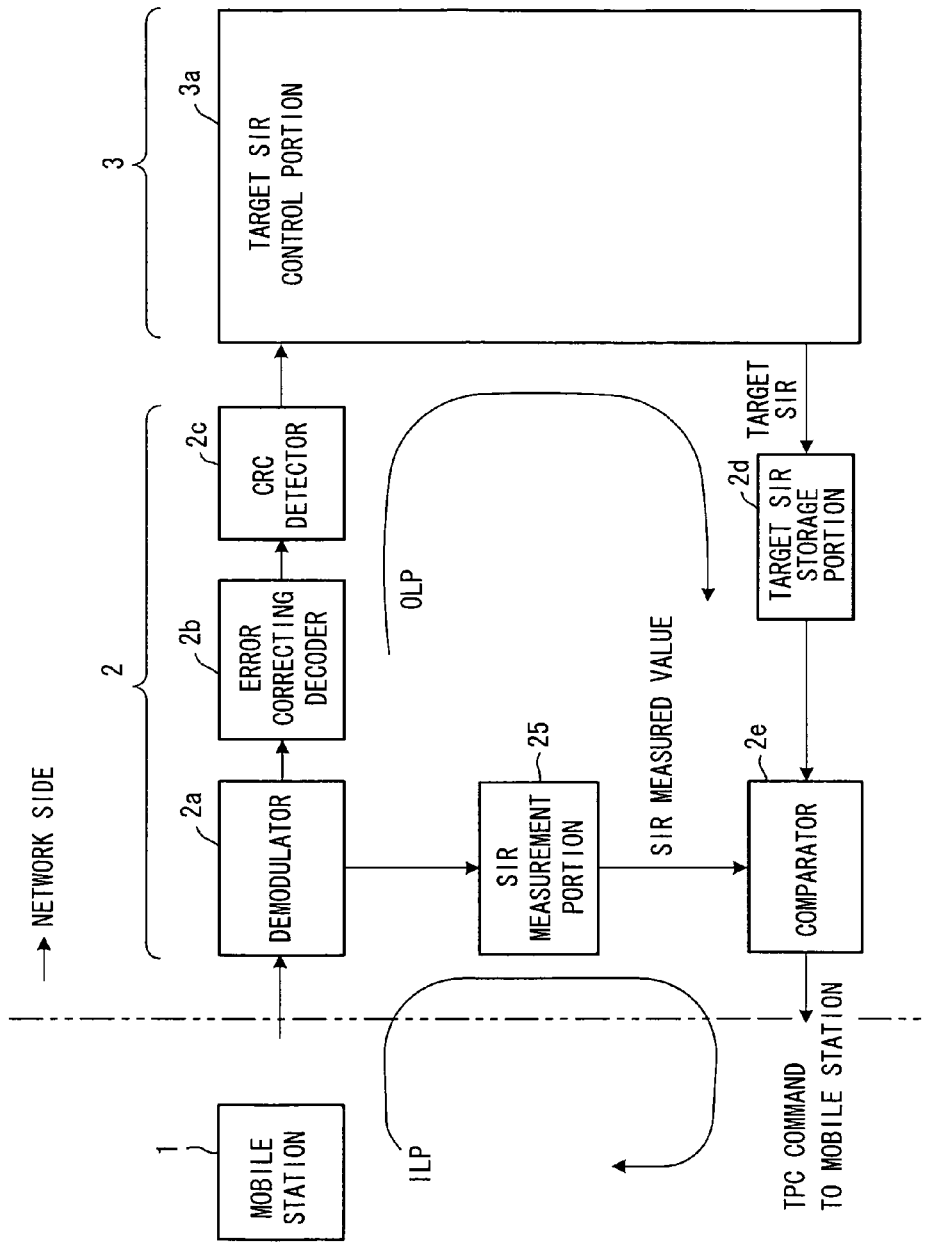
FIG. 12 explains basic transmission power control in a CDMA mobile communication system.
Figure 13:
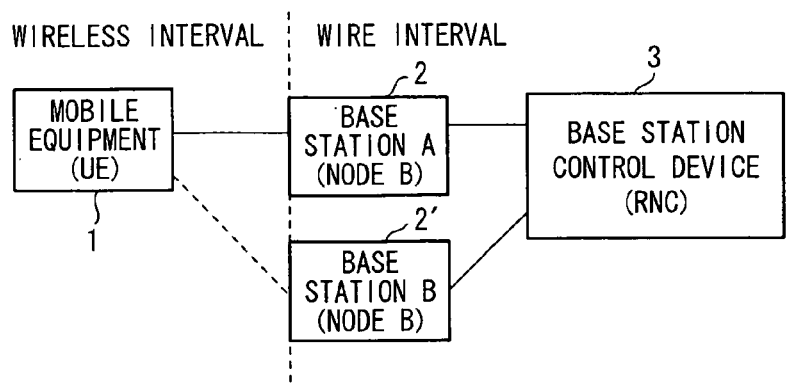
FIG. 13 is a drawing of the connection relation between a mobile station, two base stations, and a base station control device at the time of handover.

FIG. 11 is a modified example of the fourth embodiment; whereas in the fourth embodiment the new target SIR values of the base stations 10a, 10b are calculated by the base stations, in the modified example the base station control device calculates the new target SIR values for the base stations 10a, 10b, and transmits the results to the base stations.

The adder 58 adds the reference SIR stored in register 52 and the increase or decrease in target SIR output from the switching portion 55, and transmits the addition result to the base station 10a as the target SIR, while also updating the reference SIR value of the register 52 with the addition result. The base station 10a executes transmission power control for the mobile station based on the new target SIR value thus sent. Similarly, the target SIR update control portion 57 updates the target SIR for the base station 10b, and the base station 10b executes transmission power control for the mobile station based on the updated target SIR.

According to the transmission power control of the fourth embodiment described above, the target SIR of a base station is calculated based on the data quality before diversity processing, and the target SIR of the base station is made to reflect the difference between the target SIR and the previous target SIR according to the selectivity, so that the target SIR value of each base station can be controlled gradually, and more finely-tuned transmission power control can be executed, taking into account the diversity gain of selective diversity.

What is claimed is:

1. A transmission power control method during handover, in a CDMA mobile communication system which controls the uplink transmission power of a mobile station so as to obtain a target SIR and controls the target SIR based on the quality of the transmission path, comprising steps of:
   monitoring quality of each of the transmission paths, when one mobile station is transmitting and receiving the same data simultaneously with a plurality of base stations during handover;
   selecting data received over the transmission path with the best quality and calculating, for each transmission path, the selectivity of data sent over the transmission path;
   updating the target SIR based on the data quality after data selection; and, multiplying the target SIR after updating by said selectivity of each transmission path to obtain the actual target SIR for each transmission path.

2. A transmission power control method during handover, in a CDMA mobile communication system which controls the uplink transmission power of a mobile station so as to obtain a target SIR and controls the target SIR based on the quality of the transmission path, comprising steps of:
   monitoring quality of each of the transmission paths, when one mobile station is transmitting and receiving the same data simultaneously with a plurality of base stations during handover;
   selecting data received over the transmission path with the best quality and calculating for each transmission path, the selectivity of data sent over the transmission path;
   updating for each transmission path, the target SIR based on the data quality prior to data selection; and
   multiplying, for each transmission path, the target SIR after updating by said selectivity of the transmission path to obtain the actual target SIR of the transmission path.

3. A transmission power control method during handover, in a CDMA mobile communication system which controls the uplink transmission power of a mobile station so as to obtain a target SIR and controls the target SIR based on the quality of the transmission path, comprising steps of:
   monitoring quality of each of the transmission paths, when one mobile station is transmitting and receiving the same data simultaneously with a plurality of base stations during handover;
   selecting data received over the transmission path with the best quality and calculating for each transmission path, the selectivity of data sent over the transmission path;
   updating target SIR based on the data quality after data selection;
   calculating the difference between the target SIR value after updating and the reference SIR value, which is the previous updated SIR value; and,
   multiplying said difference by the selectivity of each transmission path to calculate the increase or decrease in target SIR for each transmission path, and adding the increase or decrease for each transmission path to the target SIR up to that time for each transmission path, to obtain the actual target SIR for each transmission path.

4. A transmission power control method during handover, in a CDMA mobile communication system which controls the uplink transmission power of a mobile station so as to obtain a target SIR and controls the target SIR based on the quality of the transmission path, comprising steps of:
   monitoring quality of each of the transmission paths, when one mobile station is transmitting and receiving the same data simultaneously with a plurality of base stations during handover;
   selecting data received over the transmission path with the best quality and calculating, for each transmission path, the selectivity of data sent over the transmission path; and,
   updating, for each transmission path, the target SIR based on the data quality prior to data selection;
   calculating, for each transmission path, the difference between the target SIR value after updating and the target SIR of the transmission path up to that time; and
   multiplying, for each transmission path, the difference by the selectivity of the transmission path to calculate the increase or decrease in target SIR of the transmission path, and adding the increase or decrease to the target SIR of the transmission path up to that time to obtain the actual target SIR.

5. The transmission power control method according to claim 1, wherein each base station controls the uplink transmission power of the mobile station based on the target SIR, and also appends a quality identifier indicating the quality of received data to the received data and transmits said received data from the mobile station to a base station control device, and said base station control device executes control to update the target SIR based on the quality of each transmission path.

6. A transmission power control device, in a CDMA mobile communication system which controls the uplink transmission power of a mobile station so as to obtain a target SIR and controls the target SIR based on the quality of the transmission path, comprising:
   a quality monitoring portion, which, when one mobile station transmits and receives the same data simultaneously with a plurality of base stations during handover, monitors the quality of each of the transmission paths;

a data selection portion, which selects data received over the transmission path with the best quality, and for each transmission path calculates selectivity of data sent over the transmission path;

a target SIR update portion, which updates the target SIR based on the data quality after data selection; and, calculating portion for calculating the actual target SIR for each transmission path by multiplying the target SIR after updating by the selectivity for each transmission path.

7. A transmission power control device, in a CDMA mobile communication system which controls the uplink transmission power of a mobile station so as to obtain a target SIR and controls the target SIR based on the quality of the transmission path, comprising:

a quality monitoring portion, which, when one mobile station transmits and receives the same data simultaneously with a plurality of base stations during handover, monitors the quality of each of the transmission paths;

a data selection portion, which selects data received over the transmission path with the best quality, and for each transmission path calculates selectivity of data sent over the transmission path;

for each transmission path, a target SIR update portion which updates the target SIR based on the data quality prior to data selection; and, for each transmission path, calculating portion for calculating the actual target SIR for the transmission pat by multiplying the target SIR after update with said selectivity for the transmission path.

8. A transmission power control device, in a CDMA mobile communication system which controls the uplink transmission power of a mobile station so as to obtain a target SIR and controls the target SIR based on the quality of the transmission path, comprising:

a quality monitoring portion, which, when one mobile station transmits and receives the same data simultaneously with a plurality of base stations during handover, monitors the quality of each of the transmission paths;

a data selection portion, which selects data received over the transmission path with the best quality, and for each transmission path calculates selectivity of data sent over the transmission path;

a target SIR update portion which updates the target SIR based on the data quality after data selection, a difference calculation portion, which calculates the difference between the target SIR value alter update and the reference SIR value which is the previously updated SIR value;

an increase/decrease calculation portion, which multiplies said difference by the selectivity for each transmission path to calculate the increase or decrease in the target SIR for each transmission path; and a target SIR calculation portion, which adds said increase or decrease for each transmission path to the target SIR for each transmission path up to that time, to obtain the actual target SIR.

9. A transmission power control device, in a CDMA mobile communication system which controls the uplink transmission power of a mobile station so as to obtain a target SIR and controls the target SIR based on the quality of the transmission path, comprising:

a quality monitoring portion, which, when one mobile station transmits and receives the same data simultaneously with a plurality of base stations during handover, monitors the quality of each of the transmission paths;

a data selection portion, which selects data received over the transmission path with the best quality, and for each transmission path calculates selectivity of data sent over the transmission path;

for each transmission path, a target SIR update portion which updates the target SIR based on the data quality prior to data selection;

for each transmission path, a difference calculation portion which calculates the difference between the target SIR value after updating and the target SIR value for the transmission path up to that time;

for each transmission path, an increase/decrease calculation portion which multiples said difference by the selectivity of the transmission path to calculate the increase or decrease in target SIR for the transmission path; and, for each transmission path, a target SIR calculation portion which adds said increase or decrease to the target SIR for the transmission path up to that time, to obtain the actual target SIR.

10. The transmission power control device according to claim 6, wherein each base station controls the uplink transmission power of the mobile station based on the target SIR, and also appends a quality identifier indicating the quality of received data to the received data and transmits said received data to a base station control device, and the transmission power control device of said base station control device executes control to update the target SIR based on the quality of each transmission path.

11. A transmission power control device, in a CDMA mobile communication system which controls the uplink transmission power of a mobile station based on a target quality, and also controls the target quality based on the quality of the transmission path, comprising:

a data selection portion which, when one mobile station transmits and receives the same data simultaneously with a plurality of base stations during handover, selects data received over one of the transmission paths, and also, for each transmission path, obtains selection condition of data sent over the transmission path;

a target quality update portion, which updates said target quality based an the data quality after data selection; and, calculating portion for calculating the actual target quality for each transmission path by reflecting the selection condition of each transmission path in the target quality after updating.

12. A transmission power control device, in a CDMA mobile communication system which controls the uplink transmission power of a mobile station based on a target quality, and also controls the target quality based on the quality of the transmission path, comprising:

a data selection portion which, when one mobile station transmits and receives the same data simultaneously with a plurality of base stations during handover, selects data received over one of the transmission paths, and also, for each transmission path, obtains selection condition of data sent over the transmission path;

for each transmission path, a target quality update portion which updates said target quality based on the data quality prior to data selection; and, for each transmission path, a calculating portion for calculating the actual target quality of the transmission path by reflecting said selection condition of the transmission path in the target quality after updating.

13. A transmission power control device, in a CDMA mobile communication system which controls the uplink transmission power of a mobile station based on a target quality, and also controls the target quality based on the quality of the transmission path, comprising:

a data selection portion which, when one mobile station transmits and receives the same data simultaneously with a plurality of base stations during handover, selects data received over one of the transmission paths, and also, for each transmission path, obtains selection condition of data sent over the transmission path;

a target quality update portion which updates said target quality based on the data quality after data selection;

a difference calculation portion, which calculates the difference between the target quality value after updating and the reference quality value which is the previously updated quality value;

an increase/decrease calculation portion, which reflects the selection condition in said difference for each transmission path and calculates the increase or decrease in target quality for each transmission path; and, a target quality calculation portion, which for each transmission path adds said increase or decrease to the target quality for each transmission path up to that time, to obtain the actual target quality.

14. A transmission power control device, in a CDMA mobile communication system which controls the uplink transmission power of a mobile station based on a target quality, and also controls the target quality based on the quality of the transmission path, comprising:

a data selection portion which, when one mobile station transmits and receives the same data simultaneously with a plurality of base stations during handover, selects data received over one of the transmission paths, and also, for each transmission path, obtains selection condition of data sent over the transmission path;

for each transmission path, a target quality update portion which updates the target quality based on the data quality prior to data selection;

for each transmission path, a difference calculation portion which calculates the difference between the target quality value after updating and the target quality for the transmission path up to that time;

for each transmission path, an increase/decrease calculation portion which reflects the selection condition of the transmission path in said difference, and calculates the increase or decrease in target quality for the transmission path; and, for each transmission path, a target quality calculation portion which adds said increase or decrease to the target quality for the transmission path up to that time, to obtain the actual target quality.

15. The transmission power control method according to claim 2, wherein each base station controls the uplink transmission power of the mobile station based on the target SIR, and also appends a quality identifier indicating the quality of received data to the received data and transmits said received data from the mobile station to a base station control device, and said base station control device executes control to update the target SIR based on the quality of each transmission path.

16. The transmission power control method according to claim 3, wherein each base station controls the uplink transmission power of the mobile station based on the target SIR, and also appends a quality identifier indicating the quality of received data to the received data and transmits said received data from the mobile station to a base station control device, and said base station control device executes control to update the target SIR based on the quality of each transmission path.

17. The transmission power control method according to claim 4, wherein each base station controls the uplink transmission power of the mobile station based on the target SIR, and also appends a quality identifier indicating the quality of received data to the received data and transmits said received data from the mobile station to a base station control device, and said base station control device executes control to update the target SIR based on the quality of each transmission path.

18. The transmission power control device according to claim 7, wherein each base station controls the uplink transmission power of the mobile station based on the target SIR, and also appends a quality identifier indicating the quality of received data to the received data and transmits said received data to a base station control device, and the transmission power control device of said base station control device executes control to update the target SIR based on the quality of each transmission path.

19. The transmission power control device according to claim 8, wherein each base station controls the uplink transmission power of the mobile station based on the target SIR, and also appends a quality identifier indicating the quality of received data to the received data and transmits said received data to a base station control device, and the transmission power control device of said base station control device executes control to update the target SIR based on the quality of each transmission path.

* * * * *